US011544943B1

(12) United States Patent
Rimchala et al.

(10) Patent No.: US 11,544,943 B1
(45) Date of Patent: Jan. 3, 2023

(54) ENTITY EXTRACTION WITH ENCODER DECODER MACHINE LEARNING MODEL

(71) Applicant: Intuit Inc., Mountain View, CA (US)

(72) Inventors: Tharathorn Rimchala, San Francisco, CA (US); Peter Frick, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/829,010

(22) Filed: May 31, 2022

(51) Int. Cl.
*G06V 30/19* (2022.01)
*G06V 30/413* (2022.01)

(52) U.S. Cl.
CPC ...... *G06V 30/19167* (2022.01); *G06V 30/413* (2022.01)

(58) Field of Classification Search
CPC .................. G06V 30/19167; G06V 30/413
USPC ........................................................ 382/159
See application file for complete search history.

(56) References Cited

U.S. PATENT DOCUMENTS

| | | | |
|---|---|---|---|
| 2009/0208125 A1* | 8/2009 | Kajiwara | H04N 1/41 382/243 |
| 2021/0012102 A1* | 1/2021 | Cristescu | G06K 9/6271 |
| 2021/0240932 A1* | 8/2021 | Erdemir | G06V 30/414 |

OTHER PUBLICATIONS

Raffel, C., et al., "Exploring the Limits of Transfer Learning with a Unified Text-to-Text Transformer", Journal of Machine Learning Research 21 (2020), Jul. 28, 2020, 67 pages.
Powalski, R., et al., "Going Full-TILT Boogie on Document Understanding with Text-Image-Layout Transformer", Jul. 12, 2021, 18 pages.
Rothe, S., et al., "Leveraging Pre-Trained Checkpoints for Sequence Generation Tasks", Apr. 16, 2020, 17 pages.
Von Platen, P., "Leveraging Pre-Trained Language Model Checkpoints for Encoder-Decoder Models", Nov. 9, 2020, 49 pages.

* cited by examiner

*Primary Examiner* — Amandeep Saini
(74) *Attorney, Agent, or Firm* — Ferguson Braswell Fraser Kubasta PC (57) ABSTRACT

A method includes executing an encoder machine learning model on multiple token values contained in a document to create an encoder hidden state vector. A decoder machine learning model executing on the encoder hidden state vector generates raw text comprising an entity value and an entity label for each of multiple entities. The method further includes generating a structural representation of the entities directly from the raw text and outputting the structural representation of the entities of the document.

15 Claims, 7 Drawing Sheets

ENTITY EXTRACTION WITH ENCODER DECODER MACHINE LEARNING MODEL

BACKGROUND

Automatic data extraction is complex because computers do not "read" documents in a similar manner to humans. Namely, computers, which operate on binary encodings, cannot simply look at a document and gather the pertinent information. When an optical character recognition (OCR) engine receives the document as an image, the engine recognizes the text of the document and extracts tokens. At this point, however, these tokens are merely discrete groupings of characters and are not associated with any entity or even type of entity. The discrete groups of tokens may each be assigned a token label. Then, groups of tokens may be combined to create an entity with an entity label. A challenge exists in minimizing the execution time while maintaining or improving the accuracy level of data extraction.

SUMMARY

In general, in one aspect, one or more embodiments relate to a method. The method includes executing an encoder machine learning model on multiple token values contained in a document to create an encoder hidden state vector. A decoder machine learning model executing on the encoder hidden state vector generates raw text comprising an entity value and an entity label for each of multiple entities. The method further includes generating a structural representation of the entities directly from the raw text and outputting the structural representation of the entities of the document.

In general, in one aspect, one or more embodiments relate to a system that includes an encoder machine learning model, executing on at least one computer processor, configured to process multiple token values extracted from a document to create an encoder hidden state vector and a decoder machine learning model, executing on the at least one computer processor, configured to generate, by processing the encoder hidden state vector, raw text comprising an entity value and an entity label for each of multiple entities. The system is configured to output the entities of the document.

In general, in one aspect, one or more embodiments relate to a method. The method includes executing an encoder machine learning model on a document image of a document to create an encoder hidden state vector. A decoder machine learning model executing on the encoder hidden state vector generates raw text comprising an entity value and an entity label for each of multiple entities. The method further includes generating a structural representation of the entities directly from the raw text and outputting the entities of the document.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to an encoder decoder model that directly uses, as input, the document image and/or the output of an optical character recognition (OCR) engine, and directly produces, as output, entities having an entity label and an entity value pairs. An entity is the lowest level of granularity for which data extraction is performed. For example, an entity may be a first name, a middle name, and a last name, a social security number, etc. Entities may be composed of multiple tokens. A token is the output of the OCR engine and may include parts of an entity. Individually, a token may be not useful (e.g., the first digits of social security number, part of a name of an address, or other portion of an entity). Grouped with other tokens, an entity is formed and is the data to extract.

By creating an encoder decoder model that outputs the entities directly, without requiring further processing, the overall system is simplified over past solutions. For example, whereas past solutions only identified token labels individually for tokens, and then had a separate noisy conversion step to group tokens to entities and to associate corresponding entity labels, one or more embodiments bypass the separate conversions. Thus, the training and execution time of the system is reduced.

Figure 1:
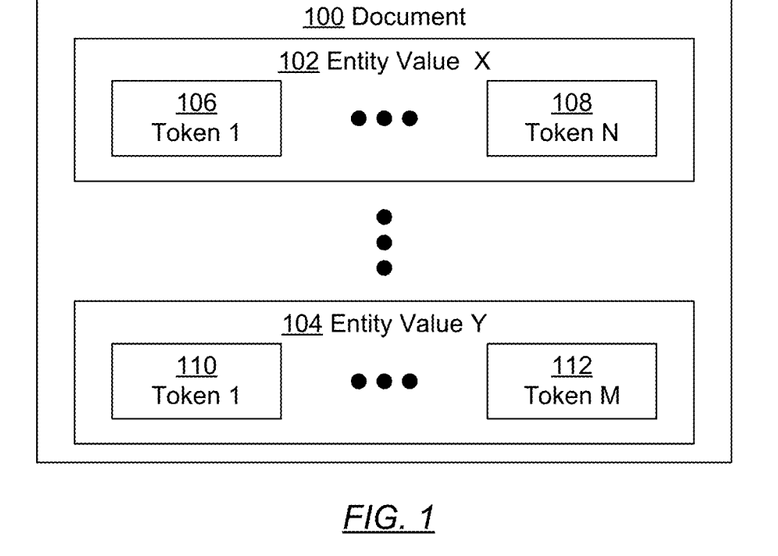
FIG. 1 shows a diagram of a document in accordance with one or more embodiments.

FIG. 1 shows a diagram of a document (100) in one or more embodiments. As shown in FIG. 1, the document (100) contains entity values (e.g., entity value X (102), entity value Y (104)). Entity values are the content of the document that is the target of the extraction. Entity values (e.g., entity value X (102), entity value Y (104)) in the document (100) may be composed of one or more token values (e.g., entity value X token 1 (106), entity value X token N (108), entity value Y token 1 (110), entity value Y token M (112)). A token value is often an individual word or term within a sentence or phrase. In some examples, the token value may be punctuation characters, special characters (e.g., monetary symbol) or other character or collection of characters produced by a tokenization process.

Figure 2:
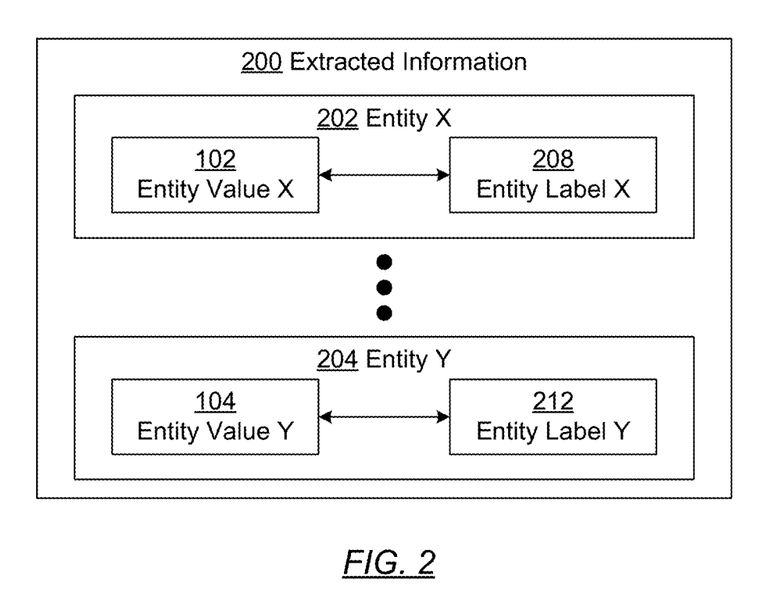
FIG. 2 shows a diagram of extracted information in accordance with one or more embodiments.

FIG. 2 shows a diagram of extracted information (200). The extracted information (200) may be information extracted from a single document or from multiple documents. For example, extracted information from one document may be verified using extracted information from another document. The goal of content extraction of a document is to extract the entity values (e.g., entity value X (102), entity value Y (104)) from the document and associate the entity values (e.g., entity value X (102), entity value Y (104)) with an entity label (e.g., entity label X (208), entity label Y (212)) to form an entity (e.g., entity X (202), entity Y (204)). Thus, an entity is an entity value, entity label pair. The entity label relates the entity value to the type of information represented by the entity value. In one or more embodiments, the entity label is a numeric, alphanumeric, or alphabetical identifier. For example, the entity label may be a string of characters in a natural language that is descriptive of the type of entity. The entity with the entity label, entity value pair may be referred to as a field-value pair, key-value pair or other pair that relates a value to the information defining what the value represents. For example, if the extracted content is to be stored in a relational database, the entity label is the attribute, and the entity value is the attribute value that is stored.

Returning to FIG. 1, in one or more embodiments, the document (100) obtained by the system is a document image. A document image is a document in an image file format. In the image file format, the computer encoding of content in the document encodes the location of colors of pixels rather than character or word encoding. For example, the original document may be a scanned version of the document.

In one or more embodiments, the original document includes a character encoding. However, the characters in the document may be unassociated with what the characters represent. For example, numbers may be unassociated with that which the numbers represent. Similarly, words or letters may be unassociated with the information represented by the words or numbers.

In some embodiments, the document (100) is a financial document. The financial document may be any document that includes financial information. Some examples of the financial document include a receipt, a tax document (e.g., W2), a bank statement, a balance sheet, a cash flow statement, a profit and loss statement, etc. The financial document may include text that may indicate financial values and information, names of business entities, date, address, codes, and symbols, etc.

In one or more embodiments, the document (100) may be a structured document. A structured document may comprise a plurality of pre-defined fields. Each field is a particular location of an entity value, such as relative to the document dimension. Examples of structured documents may include standardized forms. The input text token values may be derived from the financial document based on the predefined fields. The structure of the structured document may be unknown to the system. For example, while the structured document may follow a template, the template may be unknown to the overall system. Thus, the association of the entity value with the entity label may be unknown based on the structured document.

In one or more embodiments, the document (100) may be an unstructured document. In an unstructured document, the entity values may appear in nondeterministic locations within the document. Examples of unstructured documents include letters, contracts, variable length receipts, etc.

Figure 3:
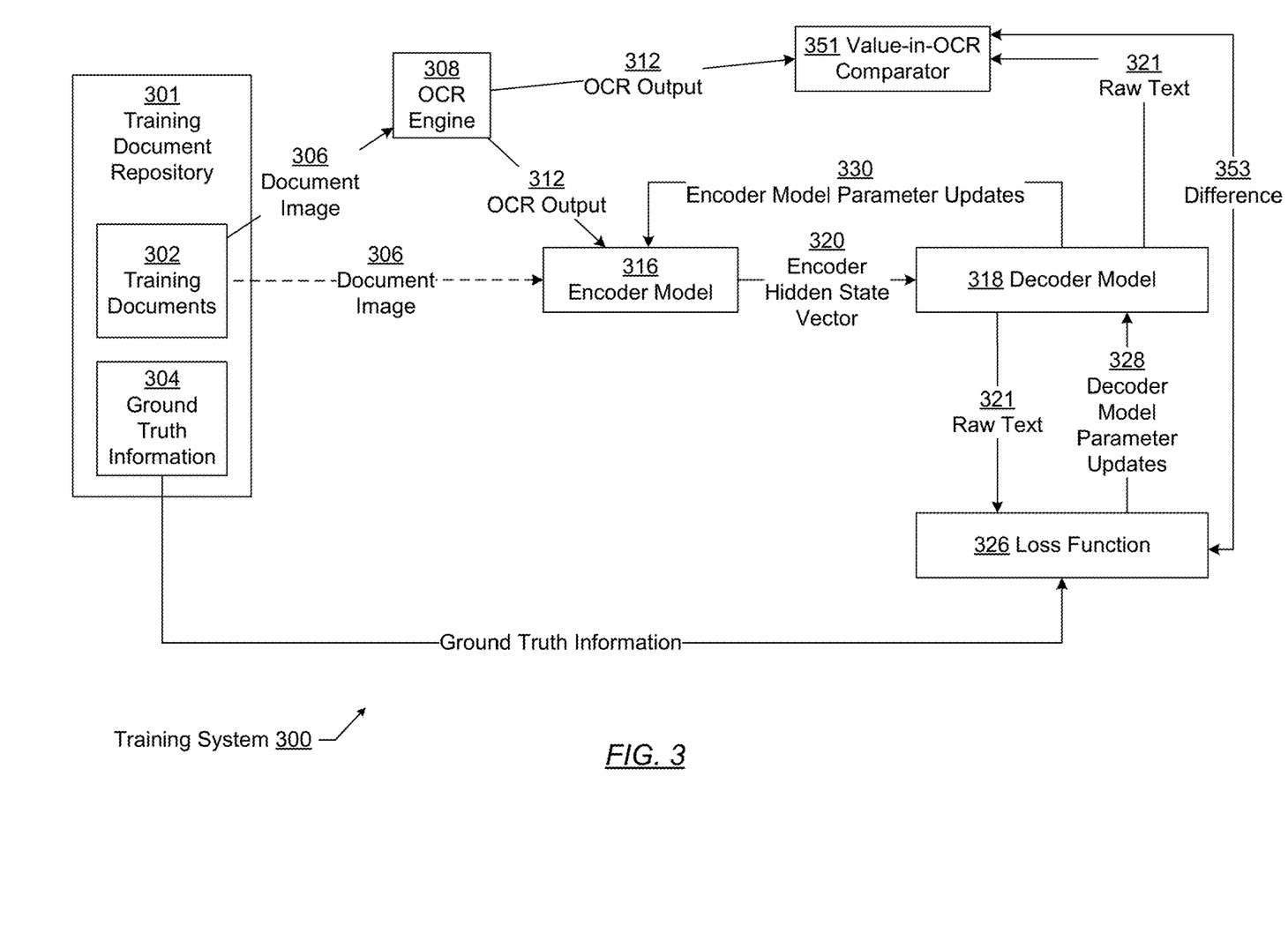
FIG. 3 shows a diagram of a training system in accordance with one or more embodiments.

FIG. 3 shows a diagram of a training system (300) in accordance with one or more embodiments. The training system (300) is a system used to train the machine learning models. The training system (300) may be the same computing system or a different computing system than the production system (shown in FIG. 4).

As shown in FIG. 3, the training document repository (301) is a data repository for storing training data. A data repository, in general, is any type of storage unit, device, or storage structure for storing data. In the training data repository (301), the training data includes training documents (302) and ground truth information (304). Training documents (302) are documents that are each associated with corresponding ground truth information (304). For a particular training document, the corresponding ground truth information includes a correct document label of the corresponding training document, and entity labels that are each associated with the corresponding entity value in the corresponding training document. The document label is an identifier of the document type of the training document. Thus, the ground truth information is deemed correct extracted content from the corresponding training document. Ground truth information may be information extracted by a human review of the document.

If the training document is a document image, the document image (306) may be transmitted to an Optical Character Recognition (OCR) engine (308). The OCR engine is a visual based model that is trained to detect text from the image formatted document (e.g., electronic/scanned copy or a hard copy format or mobile captured images) and generate output including machine encoded text. In some examples, specialized software may be used to convert scanned images of text to electronic text that may enable searching, indexing and/or retrieval of digitized data. In some example embodiments, OCR engine (308) may be developed and optimized for extracting data from business/financial documents, tax documents, checks, invoices, bank statements, insurance documents, and/or alike. The OCR engine (308) may be trained and optimized by processing data sets of scanned documents and/or images. In some examples, the OCR engine (308) may be implemented by one or more processors.

The OCR engine may identify text as a linear sequence of individual characters with corresponding character bounding boxes from the document. Then, a tokenizer partitions the linear sequence of characters into sub-word pieces, words, or terms. The tokenization process may convert the characters into token values. The token values may be useful semantic units for further processing. The tokenization is performed by locating word boundaries (e.g., ending point of a word and beginning point of the next word) in a piece of text. In some examples, the tokenization process may discard certain characters (e.g., punctuation, etc.).

The OCR output (312) or output of the OCR engine (308) includes text and layout information of the document image (306). The text includes the token values in the document image. Token values may be individually related to information about the location of the corresponding token value as layout. For example, layout information that is in the OCR output is positional information that includes the bounding boxes around all the token values in the document image.

Continuing with FIG. 3, the OCR engine (308) is connected to a machine learning framework that includes an encoder machine learning model (i.e., encoder model (316)) and a decoder machine learning model (i.e., decoder model (318)). In one or more embodiments, the system employs a reconfigurable framework for encoder decoder pre-trained language models (PLMs). Various encoder models and decoder models may be used by the system, whereby the encoder model and decoder model are selected to balance execution training and inference execution times, model capacity, throughputs and accuracy for the particular document type. The encoder model (316) takes an input, such as the OCR output (312) and/or the document image (306). The encoder model (316) generates an encoded hidden state vector (320) as output. In one or more embodiments, the raw OCR text is first converted to a sequence word or subword tokens by a tokenizer specific to the encoder model, each token with corresponding token embedding vector and one dimensional (1D) positional encoding and two dimensional (2D) layout positional embedding. Similarly, the document image gets converted to an image embedding vectors using visual feature extractors specific to the choice of encoder models. The token embedding vectors with 1D positional embedding and 2D layout positional embedding (and optionally the visual feature vectors) collectively serve as an input to the encoder model. Alternatively, the visual features (i.e., image features) can be fed directly into the decoder model. The encoder model (316) creates embeddings to individual tokens in the inputs in one or more embodiments. The decoder model (318) takes, as input, the encoder hidden state vector (320) and generates, as output, the extracted content (322).

The direct output of the decoder model (318) is raw text (321) with an entity label and entity value for each entity that is extracted. The decoder model (318) effectively groups a set of tokens into an entity value and associates the grouping with an entity label identifying the type of entity. The output of the decoder model (318), however, is a raw text (321) that is to be parsed. The raw text (321) is a string of characters that includes an entity value and an entity label for each entity, along with corresponding delimiters (e.g., semicolons, spaces, colons) between entities and entity values and entity labels as defined by a corresponding language.

The raw text (321) may be compared with a similar raw text version of the ground truth information by a loss function (326) to obtain a comparison result. The comparison result indicates whether a match or no match exists between particular entities and entity values in the raw and ground truth information. Using the comparison result, the loss function (326) is configured to generate a parameter updates. The loss function (326) is used to compute updates to the model parameters by backpropagation through the entire encoder-decoder model. The decoder model parameter updates (328) are functions of the gradient (partial derivative) of the prediction error with respect to each parameter in the decoder model propagated layer by layer from the output layer of the decoder output layer. Likewise, the encoder model parameter updates (330) are functions of the gradient (partial derivative) of the prediction error with respect to each parameter in the encoder model propagated layer by layer from the decoder model.

In one or more embodiments, the loss function (326) further includes functionality to calculate the loss (e.g., the respective model parameter updates) using a difference (353) calculated by a value-in-OCR comparator (351). The value-in-OCR comparator (351) is discussed below with reference to FIG. 5.

While general encoder models and decoder models perform natural language tasks, such as machine translations and abstractive summarization, one or more embodiments perform data extraction with the encoder and decoder models. In contrast to natural language translation, for text input, the output is generally the same as the input, but with entity labels added and assigned to entity values, which are in the input albeit not identified as such.

Further, the encoder model may assume the same type or different architecture than the decoder model. The following are examples of encoder models and decoder models. For example, a T5 encoder model may be combined with a T5 decoder model. The T5 encoder decoder model combination takes text as input and takes 60.5 million parameters. T5 is pre-trained before being fine-tuned on using the system of FIG. 3.

In another example, a BERT (Bidirectional Encoder Representations from Transformers) encoder model may be combined with a BERT for Language Modeling (BERTLM) decoder model. The BERT and BERTLM encoder decoder model combination takes text as input and takes 137.3 million parameters. BERT is a transformer language model with a variable number of encoder and self-attention layers.

In another example, a pre-trained vision based encoder such as ViT (Vision Transformer) or Swin Transformer may be combined with a text decoder (the decoder of Transformer based OCR with a language modeling (LM) output head) model. The ViT model requires an input image to be represented as uniform size image patches and was initially used for image classification tasks. The ViT encoder uses an attention mechanism among pixels in each image patch to generate the encoder hidden state vector representing image "token". The ViT and TROCR-LM encoder decoder model from pre-trained states takes an image as input, has a size of 1336 megabytes (MB), and takes 333.9 million parameters.

In another example, a LayoutLMv2 encoder model may be combined with a BERTLM decoder model. The LayoutLMv2 and BERTLM encoder decoder model combination takes text, layout, and an image together as input. The size and number of parameters of the LayoutLMv2 depends on the depth (no.layers) and width (size of hidden dimension) of the encoder and decoder. A LayoutLMv2 model having a repeated stack of transformer's encoder layers each of which encodes bidirectional representations from the multi-modal inputs (e.g., text, layout, and image) in one or more embodiments. An output of an encoder model is used as part of the inputs for the decoder model.

Figure 4:
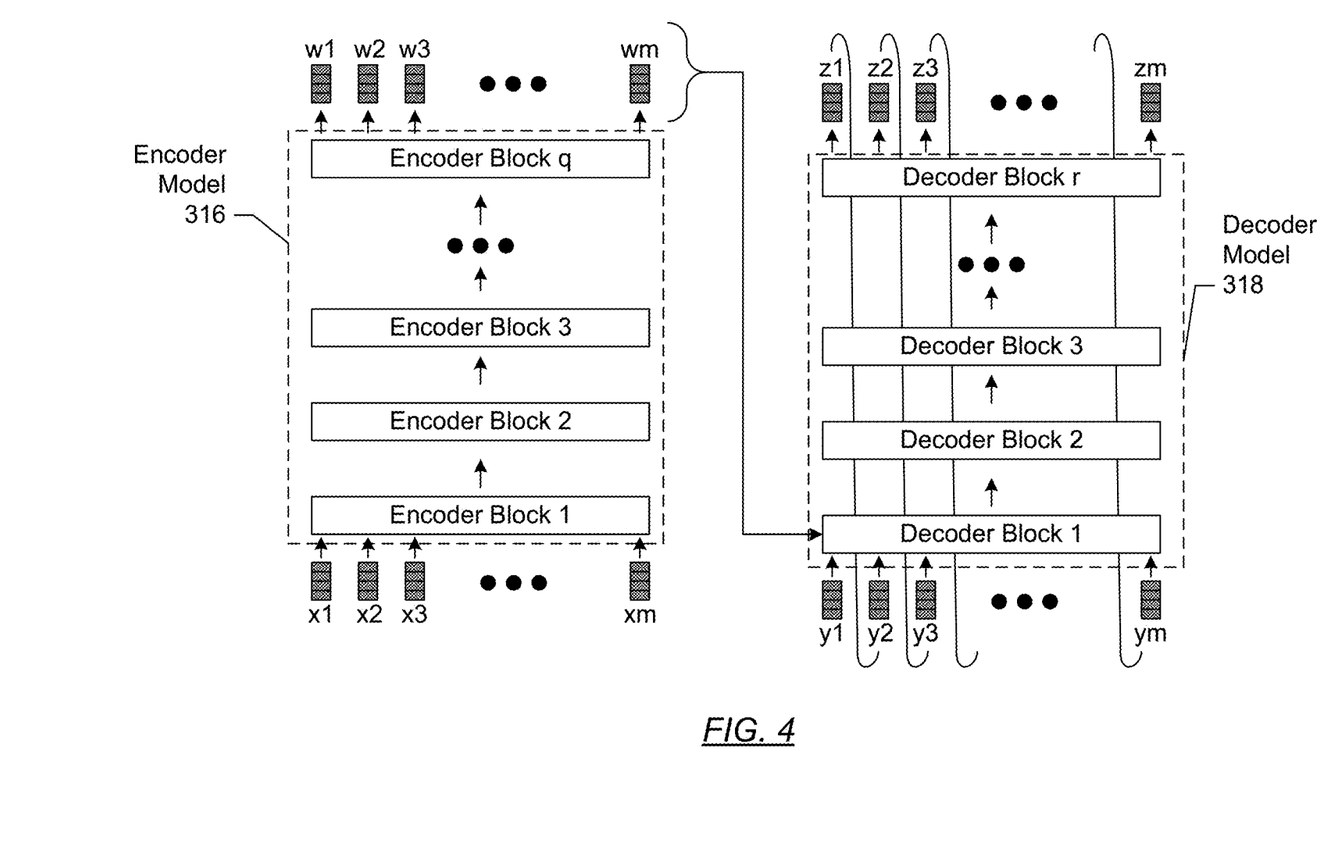
FIG. 4 shows a diagram of a production system in accordance with one or more embodiments.

FIG. 4 shows a diagram of an encoder model (316) and a decoder model (318). The encoder model (316) takes, as input, values (x1, x2, x3, . . . , xm) and produces, as output a vector (w1, w2, w3, . . . , wm). The encoder model (316) includes a stack of encoder blocks (e.g., encoder block 1, encoder block 2, encoder block 3, . . . encoder q). An output of a first encoder block (e.g., encoder block 1 in FIG. 4) may be an input of a second encoder block (e.g., encoder block 2 in FIG. 4). Similar to the encoder model (316), the decoder model (318) also includes multiple blocks. The decoder model (318) takes, as input, the encoder hidden state vector (w1, w2, w3, . . . win) that is output from the encoder model (316). As with the encoder model (316), an output of a first decoder block (e.g., decoder block 1) may be an input of a second decoder block (e.g., decoder block 2). In some examples, the number of encoder blocks may be the same or different from the number of decoder blocks.

The encoder blocks may each include a feed forward neural network (FFN) sublayer and a self-attention (SA) sublayer. The self-attention sublayer enables the encoder to use an attention mechanism to associate tokens in the other positions of an input sequence when processing a given position of the input sequence. For example, the other positions may be non-contiguous to the position that is being processed. The outputs of the self-attention sublayer may be fed to the FFN sublayer. In the example embodiments, the same structure of the FFN sublayer may be used in all encoder blocks of an encoder model.

In one or more embodiments, the encoder model processes tokens as a sequence. Each layer may apply self-attention and may pass the results through a feed-forward network, and then may hand the results off to the next encoder block. Each position in the output of the encoder outputs a vector of size hidden dimension.

The output of the encoder model (316) is the encoder hidden state vector w1 . . . wm. The encoder hidden state vector is used as input to the decoder model (318). In order to sequentially generate an output sequence one token at a time, the decoder model uses the causal attention mechanism which involves combining the previous input (token) embedding vector and the encoder hidden state vectors as an input. The decoder model (318) then passes the combined input (encoder hidden state vector and previous token embedding vector) through a sequence of decoder blocks to produce decoder output z1. The decoder output from the previous position (i.e., previous decoded output) is used in combination with the encoder hidden state vector as input for the next iteration of the decoder model (318). Thus, for the second token position, z1 is processed in conjunction with the encoder hidden state vector through the decoder blocks to create output z2. The process repeats to create decoded output z1 . . . zm. Although notation m is used for each input and output, the value of m may vary and thus, the size of the inputs and outputs may differ from each other.

Figure 5:
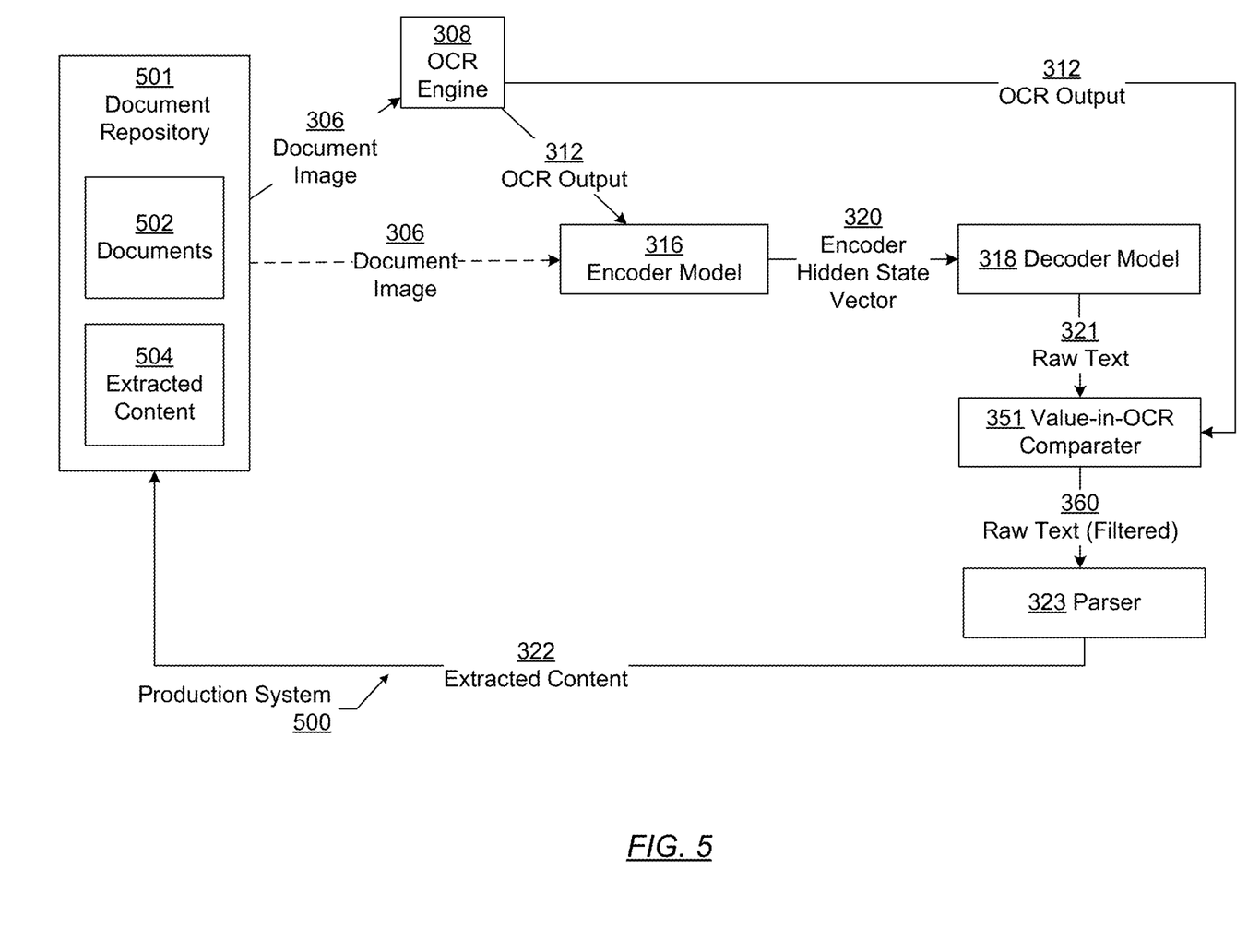
FIG. 5 shows a diagram of an encoder decoder machine learning models in accordance with one or more embodiments.

When the models are deemed trained, such as by satisfying a convergence criterion, the system may be deployed to a production system. The production system may be the same or different computer system than the training system (300). FIG. 5 shows a diagram of a production system (500) in accordance with one or more embodiments.

Turning to FIG. 5, like reference numbers are used for the same elements as shown in FIG. 3. The like numbered components shown in FIG. 5 may be deemed trained versions of the like numbered components shown in FIG. 3. Continual training may optionally be performed resulting in additional components which are not shown in FIG. 5.

In FIG. 5, the documents (502) are the target document images for extracting entities. For example, the documents (502) may be image formatted versions of documents that are of heterogeneous document types. For example, a user may scan or take pictures of a variety of documents and not bother labeling what each document is. The production system (500) is configured to extract the entities as extracted content (504) from the various documents (502).

The operations of the production system (500) may be the same or similar to the operations of the training system (300), without the training. For example, a document image (306) from the document repository (501) may be passed to an OCR engine (308) that generates OCR output (312). The encoder (316) and decoder models are the trained version of the encoder and decoder models in FIG. 3. The output of the encoder and decoder model is the raw text (321). The raw text directly includes the entity values and the entity labels along with corresponding delimiters between entities. The delimiters in the raw text may be, for example, semi-colons between entities and colons between entity values and entity labels. The raw text may be passed to a parser (323) that generates a structural representation, which is extracted content (322) that is stored in the document repository (501). A structural representation is a data structure in which each entity is separated in the data structure with a separated entity value and entity label. For example, rather than a single string of entity values, entity labels and corresponding delimiters, the structural representation has a data structure for the document and is composed of individual separate data structures for entities. An example of the structural representation is a JavaScript Object Notation (JSON) document or eXtensible Markup Language (XML) document. Other data structures may be used for the structural representation.

For example, the parser (323) may be a JSON Parser or XML Parser. In one or more embodiments, the parser only parses the raw text (321) based on the entity values and entity labels to output the extracted content as the structural representation.

To enhance the efficiency of training and inference of the end-to-end model and to enhance the accuracy of the extraction, the value-in-OCR comparator (351) is used to compute the difference (353) such as a normalized edit distance, between the entity values of the raw text (321) from the text content in the OCR output (312). The control mechanism introduced by the value-in-OCR comparator (351) has an effect of nudging the decoder model (318) to output extracted values that are likely contained within the OCR output (e.g., in the context of a high performance OCR engine with low character misrecognition rate). The value-in-OCR comparator (351) takes the raw text generated by the decoder model (321) and the OCR text in the OCR output (312) as an input. For each entity value in the raw text (321), the value-in-OCR comparator (351) computes the difference (353) between the extracted entity value with the closest word span in the OCR text of the OCR output. In the training system (300), the difference (353) is computed by or provided to the loss function (326). The difference (353) is incorporated into the decoder model parameter update (328) and encoder model parameter update (330). In the production system (500), the value-in-OCR comparator (351) is used (optionally) to suppress the extracted entity values that have a less than threshold probability of being in the OCR text of the OCR output (and might be an error due to the model) resulting in raw text that is filtered (360).

Although not shown in FIG. 3 and FIG. 5, the training and production system may include a document classification model configured to generate a document label prediction. The document label prediction is a unique identifier of the document type of the document and, optionally, a corresponding document label probability. The document type refers to the type of contents in the document. For example, the document type may be bill, invoice, tax return form, W-2 form, application, contract, or other document type.

The document classification model classifies each document into the predefined set of document labels by identifying the corresponding probability that the document belongs to each document label. Thus, the document classification model may generate a set of probabilities. The output of the document classification model may be a document label prediction having a document label in the set having the greatest document label probability, and the document label probability thereof. In the document repository, each document label may be associated with a corresponding set of expected entity labels. The expected entity labels are the expected extracted entities that should be output by the decoder for the particular document type. The document classification model may be related to an entity selector that is configured to filter the set of entities in the extracted content based on the corresponding set of entity labels.

While FIGS. 1-5 shows a configuration of components, other configurations may be used without departing from the scope of the invention. For example, various components may be combined to create a single component. As another example, the functionality performed by a single component may be performed by two or more components.

Figure 6:
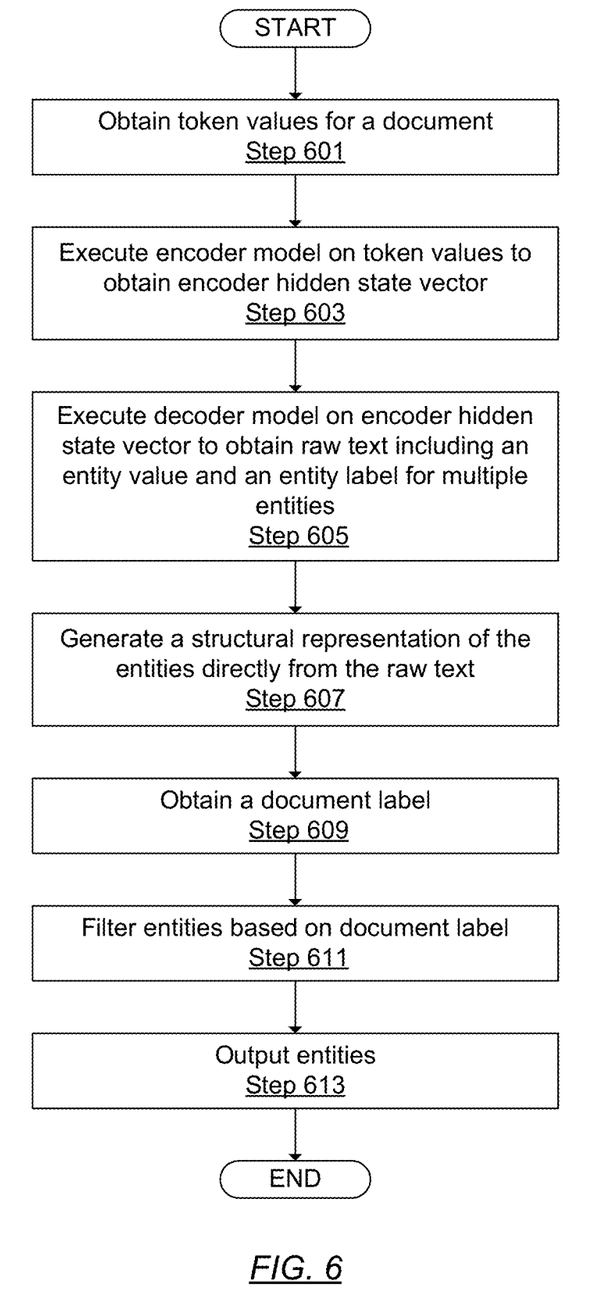
FIG. 6 shows a general flowchart in accordance with one or more embodiments.

FIG. 6 shows a flowchart in accordance with one or more embodiments. In Step 601, the token values for a document are obtained. In one or more embodiments, the OCR engine executes on the document image to generate OCR output that includes text (including the token values), layout, and bounding boxes. For the model inputs, the token values are ordered in the OCR output based on the position of the token values in the document image. For the ground truths, the token values may not only include tokens that are part of entity values, but also tokens that represent entity labels.

In Step 603, an encoder model is executed on the token values to obtain an encoder hidden state vector. The token values are processed through several layers of the trainable encoder blocks, the output of which serves as an input to the decoder model. The encoder hidden state vector represents the token values that are part of the entities, and also the neighboring context of the tokens. In some embodiments in which the encoder model is configured to use image input, obtaining the token values is skipped and the encoder model operates on the document image directly.

In Step 605, the decoder model is executed on the encoder hidden state vector to obtain raw text that includes an entity value and an entity label for multiple entities. The decoder model executes on the combined inputs of previous token embedding and encoder hidden representation vectors to generate a sequence of output tokens containing entity labels and entity values. The decoder model may have a similar structure as the encoder model but uses causal attention mechanism instead of self-bidirectional attention. The decoder model takes the encoder hidden state vector combined with the previous token embedding vectors and generates a sequence token one-by-one until a generation stopping criteria is reached. The resulting variable-length sequence is raw text that contains the entity value and entity label for each entity. The encoder-decoder model can be trained with structured sequence formatted datasets in which the model is trained to generate structure output sequence such as JavaScript Object Notation (JSON) or extensible markup language (XML) format.

Through an iterative training process, the weights of encoder and decoder models to generate output that directly includes the entities without further processing. Because the decoder model generates output sequence by predicting the next token one at a time without constraints from the tokens in the inputs, the decoder may also be trained to correct character misrecognition errors from imperfect OCR inputs. For example, the combination of encoder and decoder models may also include corrections, such as transforming the number 1 to the letter I when the expected output is a set of letters such as in the OCR word IRS. Namely, through training, the encoder decoder models may recognize that certain entities have either numeric or alphabetic output, and learn, through training, to map token values to the correct type of output for the entity.

In Step 607, a structural representation of the entities is generated directly from the raw text. In these setups, the raw decoder output text can be converted to key-value pairs directly because the encoder-decoder model is trained with structured sequence formatted datasets. Thus, the sequence of characters is already in the format of the defined structure. For example, the decoder model may output extensible markup language (XML) output. The parser only parses the structure to generate extracted content of the individual entities.

In Step 609, a document label is obtained. The document classification model is executed on the features to classify the document image and obtain a document label prediction. The document classification model executes as a neural network classifier using the features to determine the probability that the document is correctly assigned to each document label. The document label prediction may be the set of probabilities, where an individual probability exists in the set for each of multiple document labels. The document label prediction may also or alternatively include a predicted document label and corresponding probability, whereby the predicted document label is the document label having the greatest probability.

In Step 611, the entities are filtered based on the document label. From the document label, an expected set of entities are identified. The entities in the extracted content are compared to the expected set of entities to identify entities to remove during filtering. The entities that are removed are any entities having entity labels that fail to be in the expected set of entity labels. Because the removed entities, that are removed through the filtering, do not belong to the document type of the predicted document labels, the removed entities do not make sense based on the type of document. Thus, the extracted content does not include the removed entities. In some embodiments, an alert, such as through a popup or other notification may be presented to the user, to give the user an option to specify an entity label, provide a correction, or override the filtering.

In Step 613, the entities are outputted. For example, the entities may be stored. As another example, the entities may be used during a downstream process. For example, the entities may be used to generate reports, identify information about users, and perform other operations.

Figure 7:
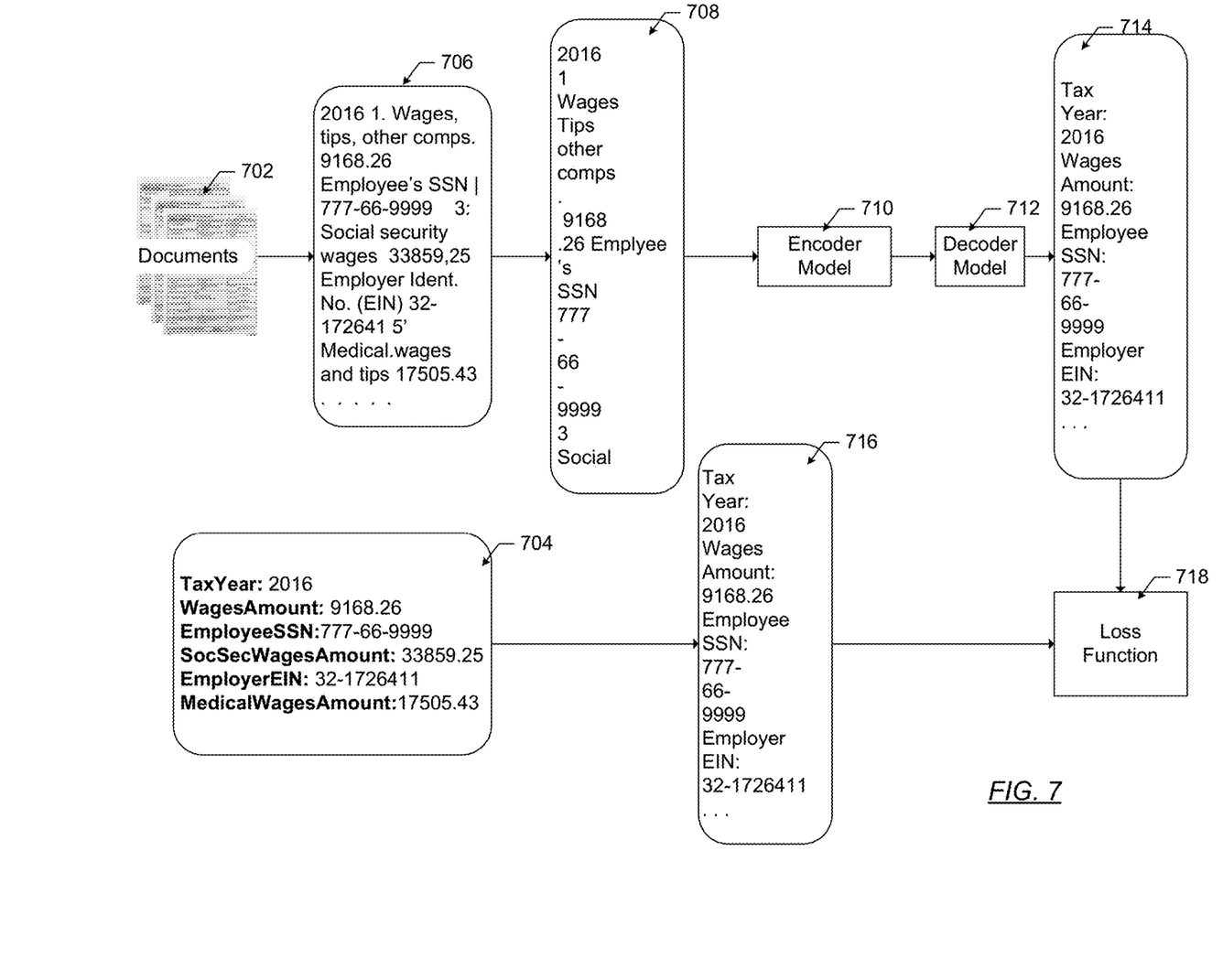
FIG. 7 shows an example in accordance with one or more embodiments.

FIG. 7 shows an example schematic diagram for processing the documents in accordance with one or more embodiments. In the example shown in FIG. 7, document images (702) and ground truth information (704) in structured text format (e.g., JSON or XML) are used to train the system. The document images (702) are passed through an OCR engine to obtain OCR output (706) that includes OCR text and bounding boxes. The OCR output may be converted to a vector representation (708), which is the OCR text divided into tokens. The vector representation of the OCR output (708) is used as input to an encoder model (710) to generate an encoder hidden state vector. The encoder hidden state vector is passed to a decoder model (712). The decoder model (712) directly sequentially generates the extracted content (714). The extracted content (714) is structure formatted text containing key-value pairs that relates each entity label with an entity identifier. As shown in the example, the output of the decoder model is entity label "Tax Year" related to entity value "2016", entity label "Wages Amount" related to entity value "9168.26", entity label "Employee SSN" related to entity value "777-66-9999", and entity label "Employer EIN" related to entity value "32-1726411". Corrections to the OCR character misrecognition errors are a byproduct of the encoder decoder model.

During training, ground truth information (704) is transformed into a structured text and then encoded by a tokenizer into a sequence of ground truth token embedding vectors (716). The ground truth vector sequence (716) is an ordered collection of token embedding vectors of the ground truth information (704). The ground truth token embedding vectors (716) are compared to the extracted content (714) to compute a model training loss (not shown). The loss is back-propagated through the encoder decoder models to update the weights of the respective models. Because the ground truth information is generally free of OCR errors, the updating to the model parameters has an effect of correction of OCR's character misrecognition errors when the system is in production.

As shown, one or more embodiments provide a simplified machine learning framework for extracting content from documents. Through the simplification, the framework executes faster while maintaining accuracy. Thus, the computing system is improved.

Figure 8A:
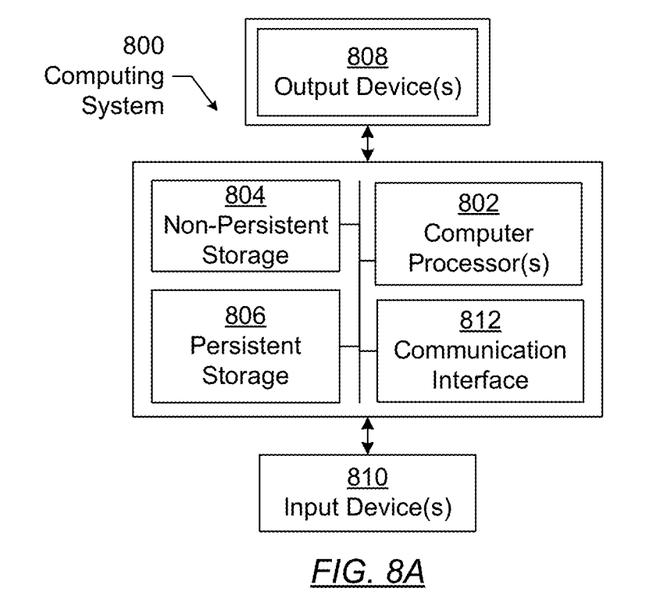
FIGS. 8A and 8B show computing system in accordance with one or more embodiments.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities that implement the features and elements of the disclosure.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 8B:
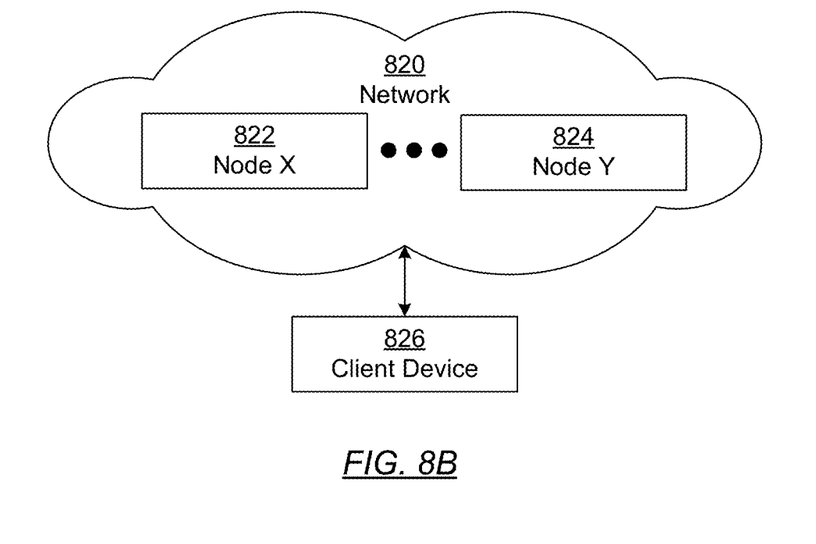

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the invention.

The computing system or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 8A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU.

In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g., join, full join, count, average, etc.), sorts (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 8A and the nodes and/or client device in FIG. 8B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
creating an encoder hidden state vector, the creating comprising executing an encoder machine learning model on a plurality of token values contained in a document, wherein executing the encoder machine learning model comprises executing a plurality of encoder blocks on the plurality of token values;
generating, by a decoder machine learning model executing on the encoder hidden state vector, raw text comprising an entity value and an entity label for each entity of a plurality of entities, wherein the plurality of entities is in the document,
wherein executing the decoder machine learning model comprises executing, for a sequence of output tokens, a plurality of decoder blocks, and
wherein for each iteration, the encoder hidden state vector is combined with a previous decoded token embedding vector to use as input to the plurality of decoder blocks;
generating a structural representation of the plurality of entities directly from the raw text; and
outputting the structural representation of the plurality of entities.

2. The method of claim 1, further comprising:
executing an optical character recognition (OCR) engine on a document image to obtain OCR output comprising the plurality of token values of the document image;
inputting the plurality of token values from the document image into the encoder machine learning model; and
suppressing the plurality of entities in the raw text that are determined to have a less than threshold probability of being in the OCR output.

3. The method of claim 2, further comprising:
inputting formatting information generated from executing the OCR engine into the encoder machine learning model.

4. The method of claim 1, further comprising:
inputting a document image into the encoder machine learning model, wherein the encoder machine learning model processes image features obtained from the document image.

5. The method of claim 1, wherein the encoder machine learning model is executed directly on optical character recognition (OCR) output without additional processing, the OCR output comprising the plurality of token values.

6. The method of claim 1, further comprising:
comparing the plurality of entities with ground truth information to obtain a comparison result;
generating, by a loss function, a loss using the comparison result; and backpropagating the loss through the decoder machine learning model and the encoder machine learning model.

7. The method of claim 1, further comprising:

executing a document classification model on the document to obtain a document type;

identifying a set of expected entity labels corresponding to the document type; and filtering, from the structural representation, an additional entity in the raw text generated by the decoder machine learning model based on the additional entity having the entity label failing to be in the set of expected entity labels.

8. A system comprising:

an encoder machine learning model, executing on at least one computer processor, configured to process a plurality of token values extracted from a document to create an encoder hidden state vector, wherein the encoder machine learning model comprises a plurality of encoder blocks to execute on the plurality of token values; and a decoder machine learning model, executing on the at least one computer processor, configured to:

generate, by processing the encoder hidden state vector, raw text comprising an entity value and an entity label for each entity of a plurality of entities, wherein the plurality of entities is in the document, wherein executing the decoder machine learning model comprises executing, for a sequence of output tokens, a plurality of decoder blocks, and wherein for each iteration, the encoder hidden state vector is combined with a previous decoded token embedding vector to use as input to the plurality of decoder blocks, wherein the system is configured to output the plurality of entities of the document.

9. The system of claim 8, further comprising:

an optical character recognition (OCR) engine processing a document image to generate a sequence of characters with bounding boxes representing a plurality of words of the document image, wherein the plurality of words from the document image are used as the plurality of token values that are input into the encoder machine learning model.

10. The system of claim 9, wherein the OCR engine is further configured to generate layout information that is input into the encoder machine learning model.

11. The system of claim 9, wherein the encoder machine learning model receives, as input, the document image and is configured to generate the encoder hidden state vector using the document image.

12. The system of claim 8, wherein the encoder machine learning model is executed directly on optical character recognition (OCR) output without additional processing, the OCR output comprising the plurality of token values.

13. The system of claim 8, further comprising:

a loss function executing on the at least one computer processor and configured to:

compare the plurality of entities with ground truth information to obtain a comparison result, and generate a loss using the comparison result, wherein the loss is back-propagated through the decoder machine learning model and the encoder machine learning model.

14. The system of claim 8, further comprising:

a document classification model configured to classify the document to determine a document type of the document; and a filter configured to:

identify a set of expected entity labels corresponding to the document type, and filter, from a structural representation, an additional entity in the raw text generated by the decoder machine learning model based on the additional entity having the entity label failing to be in the set of expected entity labels.

15. A method comprising:

creating an encoder hidden state vector, the creating comprising executing an encoder machine learning model on a document image of a document;

generating, by a decoder machine learning model executing on the encoder hidden state vector, raw text comprising an entity value and an entity label for each entity of a plurality of entities, wherein the plurality of entities is in the document;

generating a structural representation of the plurality of entities directly from the raw text;

executing a document classification model on the document to obtain a document type;

identifying a set of expected entity labels corresponding to the document type;

filtering, from the structural representation, an additional entity in the raw text generated by the decoder machine learning model based on the additional entity having the entity label failing to be in the set of expected entity labels; and outputting the plurality of entities of the document.

* * * * *